March 22, 1949.　　　A. C. ALLEN　　　2,465,183
ACCELERATOR DEPRESSOR
Filed Aug. 6, 1945
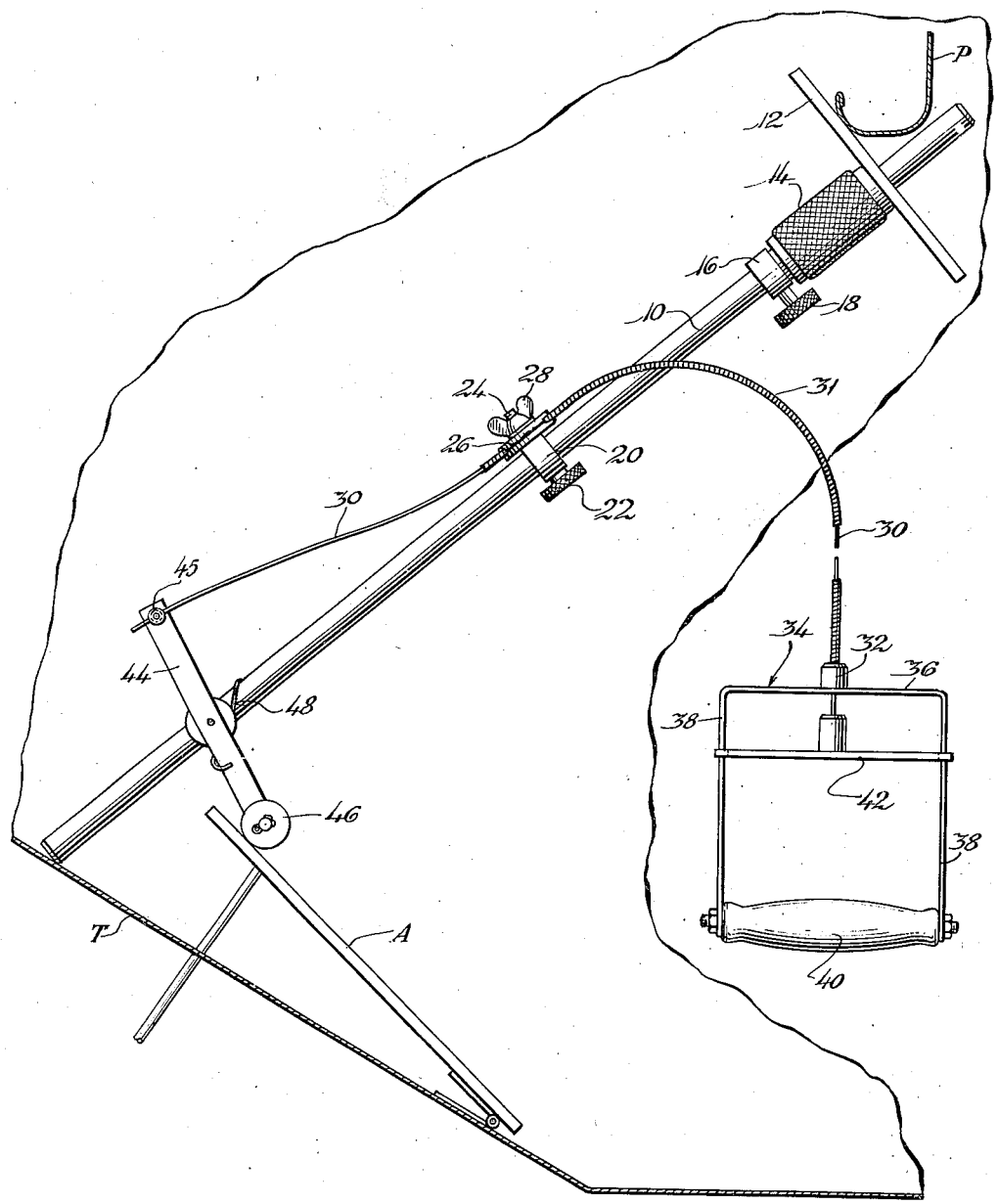

Patented Mar. 22, 1949

2,465,183

UNITED STATES PATENT OFFICE 2,465,183

ACCELERATOR DEPRESSOR

Arthur C. Allen, Chicago, Ill., assignor to Stewart-Warner Corporation, Chicago, Ill., a corporation of Virginia Application August 6, 1945, Serial No. 609,165

5 Claims. (Cl. 74—482)

This invention relates to a pedal depressor, and more particularly to a device for depressing the accelerator pedal of an automotive vehicle from a point at a distance therefrom, as from outside the vehicle.

It is often desirable for an operator to control the speed of the motor of an automotive vehicle while outside of the vehicle, so that he may observe the results of the varying operation of the motor, as in balancing the driving wheels of the vehicle. If no device is provided which permits the operator to control the accelerator pedal from his position outside the vehicle, it is necessary for him to have an assistant to operate the motor as desired. It is also often desirable for an operator to depress other operating pedals of an automobile or the like, such as the brake pedal, while outside the vehicle.

The device of this invention permits such remote control of an operating pedal of an automobile or the like, and it is of a construction enabling it quickly to be installed in or removed from the vehicle.

It is an object of this invention to provide a remote control device for an operating pedal of an automotive vehicle.

Another object is the provision of a device to depress an automotive vehicle accelerator or other operating pedal from a remote point, and including means to permit return of the pedal to normal position.

A further object is the provision of a remote control device for an accelerator or other operating pedal of an automotive vehicle, including novel means for securing the device in operative relation to the vehicle.

Other objects of the invention will appear from the following description, reference being had to the accompanying drawing, in which:

The figure is a side elevational view of the remote control device in operative position in a vehicle.

For convenience, the invention is described as applied to an accelerator pedal of an automotive vehicle, although it will be understood that it is equally well applicable to other pedals.

The control device comprises a supporting bar 10 which is adapted detachably to be secured between convenient surfaces or projections in an automotive vehicle, as between the instrument panel P and toe board T. As shown in the figure, one end of the bar is engaged against the toe board and the other against the panel by a plate 12 having an aperture therein enabling it to be axially moved along the bar. The plate is secured to a sleeve 14 and is held against the panel P so that the bar is securely wedged between the panel and toe board.

A collar 16 slidable on the bar bears against the lower end of the sleeve 14 and is provided with a thumb screw 18 so that it may be secured at any desired point on the bar 10. After the plate 12 and sleeve 14 have been brought into position with the plate pressing against the panel P so that the bar 10 is secured between the panel and toe board T, the collar 16 is moved against the sleeve 14 and the thumb screw 18 tightened.

The control device of the invention includes actuating means adjustably secured to the bar 10. The securing means includes a collar 20 slidably mounted upon the bar and clamped thereto at any desired point by a thumb screw 22. The actuating means is secured to the collar by a threaded stud 24 extending from the collar 20 through a pair of complementally grooved apertured clamping discs 26 adjustably secured on the stud for movement to different angular positions. A suitable nut, such as the wing nut 28, is screwed on the stud 24 to clamp the plates 26 on the collar 20.

The actuating means includes a Bowden wire, comprising a flexible wire 30 housed within a flexible tube 31, the latter having one end extending through the registering grooves formed in the discs 26. The other end of the tube is secured by suitable means, as by a ferrule 32, to a remotely located handle 34. The latter is generally U-shaped, having a cross member 36 and parallel legs 38. The free ends of the legs 38 are connected by a grip portion 40 secured thereto. A bar 42 is slidable along the legs 38 between the cross member 36 and the grip portion 40 and is secured to one end of the wire 30, being movable positively in opposite directions by the operator.

The control device includes a pedal depressor lever 44 one end of which is connected to the Bowden wire 30, as by a pivotal connection 45. The lever 44 is pivotally mounted on the bar 10 adjacent the lower end thereof, and carries a roller 46 located in proximity to the accelerator pedal A. A coil spring 48 is arranged with one end engaged against the bar 10 and the other end engaging the lever 44 to bias the lever to move counterclockwise and swing the roller 46 away from the pedal.

The control device of the present invention enables an operator to control the accelerator pedal from a remote point so that the operator may check the operation of the automobile and at the same time observe testing instruments or other equipment. The device is adapted readily to be installed in a convenient position in the vehicle and the Bowden wire support may be adjusted axially and angularly relative to the support bar so that the pedal depressor lever can be easily moved. The control device is normally biased by spring 48 to a position wherein the accelerator is at its idling or some other desired position. When it is desired to depress the accelerator pedal and to speed up the engine, it is necessary for the operator only to grasp the grip 40 and slidable bar 42 and to pull the latter toward the former. The movement of the bar 42 is imparted to the lever 44 through the Bowden wire 30 and the lever 44 is moved in a clockwise direction to depress the accelerator pedal. When the pressure applied to the bar 42 is released, the lever 44 is returned toward its initial position by the biasing spring 48 and the accelerator pedal is returned toward its initial position by its own biasing means.

The remote control device is useful in balancing the driving wheels of an automobile or the like, since it permits one man to observe the action of the wheels at a high speed of rotation while employing any suitable devices or instruments for detecting any unbalance of the wheels. Similarly, when it is desired to observe the operation of the motor at varying speeds, the device of this invention permits a single operator to control the speed of the motor while in any convenient position for observing the action of the motor and associated elements.

While the device has been described for use in connection with the accelerator pedal, it may equally well be employed to actuate the brake pedal or other operating pedals of an automotive vehicle. The device may thus be employed in the checking and adjusting of the brakes of an automobile or the like. If desired, two or more of the devices may be employed at the same time to operate different pedals.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A control device for an operating pedal of an automotive vehicle comprising a bar in wedged relation between the instrument panel and toe board of said vehicle, a lever pivoted on said bar with one end adapted to contact said pedal, biasing means urging said lever end away from said pedal, a flexible actuating element having one end thereof connected to the other end of said lever, and actuating means connected to the other end of said element to draw said element in one direction for pivoting said lever to depress said pedal and to release said element for return movement by said biasing means.

2. A remote control device for an operating pedal of an automotive vehicle comprising a bar, an apertured plate slidable on said bar, a collar adjustably securable on said bar to prevent movement of said plate in one direction, said bar being securable with one end adjacent said pedal by wedgingly engaging said end and said slidable plate between spaced surfaces in said vehicle, a lever pivoted on said bar adjacent said end, a roller mounted on one end of said lever to bear on said pedal, biasing means urging said roller away from said pedal, a Bowden wire having one end thereof secured to the other end of said lever, means to secure said wire at an intermediate portion thereof in slidable relation on said bar, and handle means connected to the other end of said wire for movement thereof to rock said lever for depression of said pedal by said roller.

3. A remote control device for an operating pedal of an automotive vehicle comprising a bar, means on said bar adapted to wedge the same in substantially rigid relation between spaced surfaces in said vehicle, said means including a plate slidable on said bar in substantially perpendicular relation thereto, a sleeve slidable on said bar, a first collar adjustably securable on said bar to hold said plate and sleeve against movement in one direction, a lever pivoted on said bar, a roller on one end of said lever to contact said pedal, biasing means urging said roller in a direction away from said pedal, a Bowden wire having one end thereof secured to the other end of said lever, a flexible tube slidably receiving said wire, a second collar adjustably secured on said bar, means on said collar to hold one end of said tube in adjustable fixed relation to said bar, a generally U-shaped handle frame comprising an apertured cross member connected to the other end of said tube, a pair of parallel legs, and a gripping member connecting the free ends of said legs, and a finger bar extending between said legs and slidable thereon and secured to the other end of said wire to rotate said lever for depression of said pedal upon movement of said finger bar toward said gripping member.

4. A control device for an operating pedal of an automotive vehicle comprising, a support having means for detachably clamping it to the vehicle adjacent the pedal to be operated, a lever pivoted to the support and having one end thereof engageable with the pedal, a long flexible Bowden wire and tube, one end of said wire being secured to the lever, adjustable means to secure one end of the tube to the support, and manually operable handles secured respectively to the other ends of said tube and wire.

5. A readily removable control device for an operating pedal of an automotive vehicle comprising, a bar, means for detachably clamping said bar in said vehicle with one end adjacent said pedal, a lever pivoted on said bar adjacent said end with one end of said lever in proximity to said pedal, a flexible tube having one end secured to the bar and having a handle part secured to its other end, an actuating wire extending through said tube and having one end secured to the other end of the lever for moving the latter, and a second handle part secured to the other end of the wire and cooperable with the first handle part to move the wire and tube relatively and thereby actuate the lever.

ARTHUR C. ALLEN.

REFERENCES CITED

The following references are of record in the file of this patent:

UNITED STATES PATENTS

| Number | Name | Date |
| --- | --- | --- |
| 1,446,660 | Quay | Feb. 27, 1923 |
| 1,480,616 | Kantak | Jan. 15, 1924 |
| 1,496,138 | Thompson | June 3, 1924 |
| 1,540,261 | Farmer | June 2, 1925 |
| 2,072,285 | Walker | Mar. 2, 1937 |
| 2,202,585 | Jordan, Sr. | May 28, 1940 |